US007203937B1

(12) United States Patent
Kyle et al.

(10) Patent No.: US 7,203,937 B1
(45) Date of Patent: Apr. 10, 2007

(54) SOFTWARE INSTALLATION AND CONFIGURATION WITH SPECIFIC ROLE FOR TARGET COMPUTER AND IDENTITY INDICATOR FOR AUTHORIZATION FOR PERFORMANCE OF FEATURES

(75) Inventors: Jonathan Kyle, Mountain View, CA (US); Majd Bakar, Castro Valley, CA (US); John Affaki, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 10/338,992

(22) Filed: Jan. 9, 2003

(51) Int. Cl.
*G06F 9/445* (2006.01)

(52) U.S. Cl. .................. 717/168; 717/174; 717/121; 709/222

(58) Field of Classification Search ........ 717/168–178, 717/121; 709/220, 221, 222
See application file for complete search history.

(56) References Cited

U.S. PATENT DOCUMENTS

| | | | | |
|---|---|---|---|---|
| 6,256,773 B1 * | 7/2001 | Bowman-Amuah | ......... | 717/121 |
| 6,279,030 B1 * | 8/2001 | Britton et al. | ............... | 709/203 |
| 6,295,639 B1 * | 9/2001 | Van Der Meer | ............ | 717/103 |
| 6,330,670 B1 * | 12/2001 | England et al. | ................. | 713/2 |
| 6,484,315 B1 * | 11/2002 | Ziese | ......................... | 717/173 |
| 6,785,885 B2 * | 8/2004 | Norris et al. | ................ | 717/178 |
| 6,804,780 B1 * | 10/2004 | Touboul | ..................... | 713/181 |
| 6,854,016 B1 * | 2/2005 | Kraenzel et al. | ............ | 709/229 |
| 6,918,113 B2 * | 7/2005 | Patel et al. | .................. | 717/178 |
| 6,931,546 B1 * | 8/2005 | Kouznetsov et al. | .......... | 726/23 |
| 6,957,186 B1 * | 10/2005 | Guheen et al. | ................ | 705/1 |
| 7,062,676 B2 * | 6/2006 | Shinohara et al. | ............ | 714/15 |
| 7,149,960 B1 * | 12/2006 | Brooks et al. | ........... | 715/501.1 |

OTHER PUBLICATIONS

The XML Handbook, Charles F. Goldfarb et al, 1996, pp. 101-118.*
"Focus On HP Openview" Nathan J. Muller, 1995, Whole Book.*
Kon et al., "Monitoring, Security, and Dynamic Configuration with the dynamicTAO Reflective ORB", J. Sventek and G. Coulson (Eds.): Middleware 2000, LNCS 1795, pp. 121-143, 2000, Springer-Verlag Berlin Heidelberg 2000.
Heiss, "Enterprise Rollouts with JumpStart", 1999 LISA XIII, Nov. 7-12, 1999, Seattle, WA, pp. 267-274.
M.A. Hiltunen, "Configuration, management for highly customisable software", IEE Proc.-Softw., vol. 145, No. 5, Oct. 1998, pp. 180-188.
Issarny et al., "Achieving Middleware Customization in a Configuration-Based Development Environment: Experience with the Aster Prototype", IEEE Proceedings 1998, May 4-6, 1998, pp. 207-214.
Colyer et al., "Depot: A Tool for Managing Software Environments", 1992 LISA VI, Oct. 19-23, 1992, Long Beach, CA, pp. 153-162.

* cited by examiner

*Primary Examiner*—Todd Ingberg
(74) *Attorney, Agent, or Firm*—Lee & Hayes, PLLC (57) ABSTRACT

An implementation of a technology, described herein, for software installation and/or configuration. At least one implementation, described herein, provides for the installation, configuration, or uninstallation of software components on one or more target computing systems. This described implementation includes a runtime interpreting installation and configuration ("install-config") program module and one or more data-based, runtime interpreted, install-config feature descriptions. This abstract itself is not intended to limit the scope of this patent. The scope of the present invention is pointed out in the appending claims.

26 Claims, 3 Drawing Sheets

SOFTWARE INSTALLATION AND CONFIGURATION WITH SPECIFIC ROLE FOR TARGET COMPUTER AND IDENTITY INDICATOR FOR AUTHORIZATION FOR PERFORMANCE OF FEATURES

TECHNICAL FIELD

This invention generally relates to a technology for software installation and/or configuration.

BACKGROUND

In medium to large enterprise settings, it is increasingly more common to perform customized installations and/or configurations of one or more software applications onto both new and existing computer systems. With few exceptions, the target systems of such installations and configurations are hardware and/or software heterogeneous.

Although this process is largely repetitive in nature, few tools exist to aid system administrators in this type of mass installation and/or configuration. This is especially true when the target systems are already in use. In other words, they are not brand-new, blank installations.

Therefore, systems administrators are often left to manually analyze, customize, and install. These administrators determine which software is needed to perform a desired task. They determine the custom configuration and then manually install the desired software with the customized configuration.

As the scale of a mass installation and configuration increases, this manual and ad hoc approach becomes increasingly cost-ineffective. To compensate, a system administrator may employ one of the conventional automation tools available.

Conventional Automated Installers

Two existing types of automated installers exist. One type employs a "scripted-response" and the other type employs "compiled" software. To some degree, each type automates otherwise redundant manual tasks. However, each type has significant drawbacks that limit their effectiveness.

Scripted-Response Automated Installers

This type of installer offers a script of responses for a specific installation and configuration process that would otherwise be interactive. These scripts are simply answers to an expected and specific set of queries during the installation of a specific software application. Frequently, these scripts are generated by recording an exemplary installation and configuration session. The resulting recorded script is expected to be played back at a later installation.

Example of this type of installer includes the installer for Microsoft Windows®95. More generally, this is often called "INF" automated installs.

Since it is a series of specific responses to an expected set of queries, it is inherently incapable to adjust. Therefore, it can only be employed with identical target computer systems. In other words, a given script may only be used with a group of computer systems having total homogeneity. That means that each target system must have identical hardware and software specifications. Any variation amongst the target systems and the scripted-response installer fails.

Furthermore, modifying such scripts are, at best, difficult. A slight modification in the installation process requires a creation of a new script. Consequently, the scripts cannot be modified at "runtime"; rather, these scripts must be redeveloped to be modified. Herein, "runtime" for the installer is when the installation or configuration of the computer system actually occurs.

Moreover, these types of scripted-responses are typically employed for the installation of a single application on a computer system.

Compiled Automated Installers

This type of installer is effectively a compiled application that is developed specifically for the installation and/or configuration of a specific application.

Example of this type includes InstallShield®.

Since it is a compiled program, it may be capable of some programmed adjustments. Therefore, it can only be employed with in an expected set of known target computer systems. In other words, a given compiled installer may be used with only a group of computer systems having limited heterogeneity. That means that the hardware and software specifications of each target system may only vary within a defined range of variance. Any variation outside that defined range and the compiled installer fails.

Furthermore, these compiled installers cannot be customized at runtime. By its nature, the installer must be recompiled for further customization. Therefore, a slight modification in the installation process requires a recompilation of the original installation script. Consequently, compiled installers cannot be modified at "runtime"; rather, it must be redeveloped to be modified.

Moreover, these types of compiled installers are typically employed for the installation of a single application on a computer system.

SUMMARY

Described herein is a technology for software installation and/or configuration.

At least one implementation, described herein, provides for the installation, configuration, and/or uninstallation of software components on one or more target computing systems. This described implementation includes a runtime interpreting installation and configuration ("install-config") program module and one or more data-based, runtime interpreted, install-config feature descriptions.

For at least one implementation described herein, these feature descriptions are human-readable and easily modifiable formatted text containing data concerning the install-config of software components. For at least one implementation described herein, the install-config program module of this described implementation interprets these feature descriptions at runtime of the install-config.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of a Software Installation and Configuration Manager that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Software Installation and Configuration Manager may be referred to as an "exemplary install-config manager."

Introduction

Figure 3:
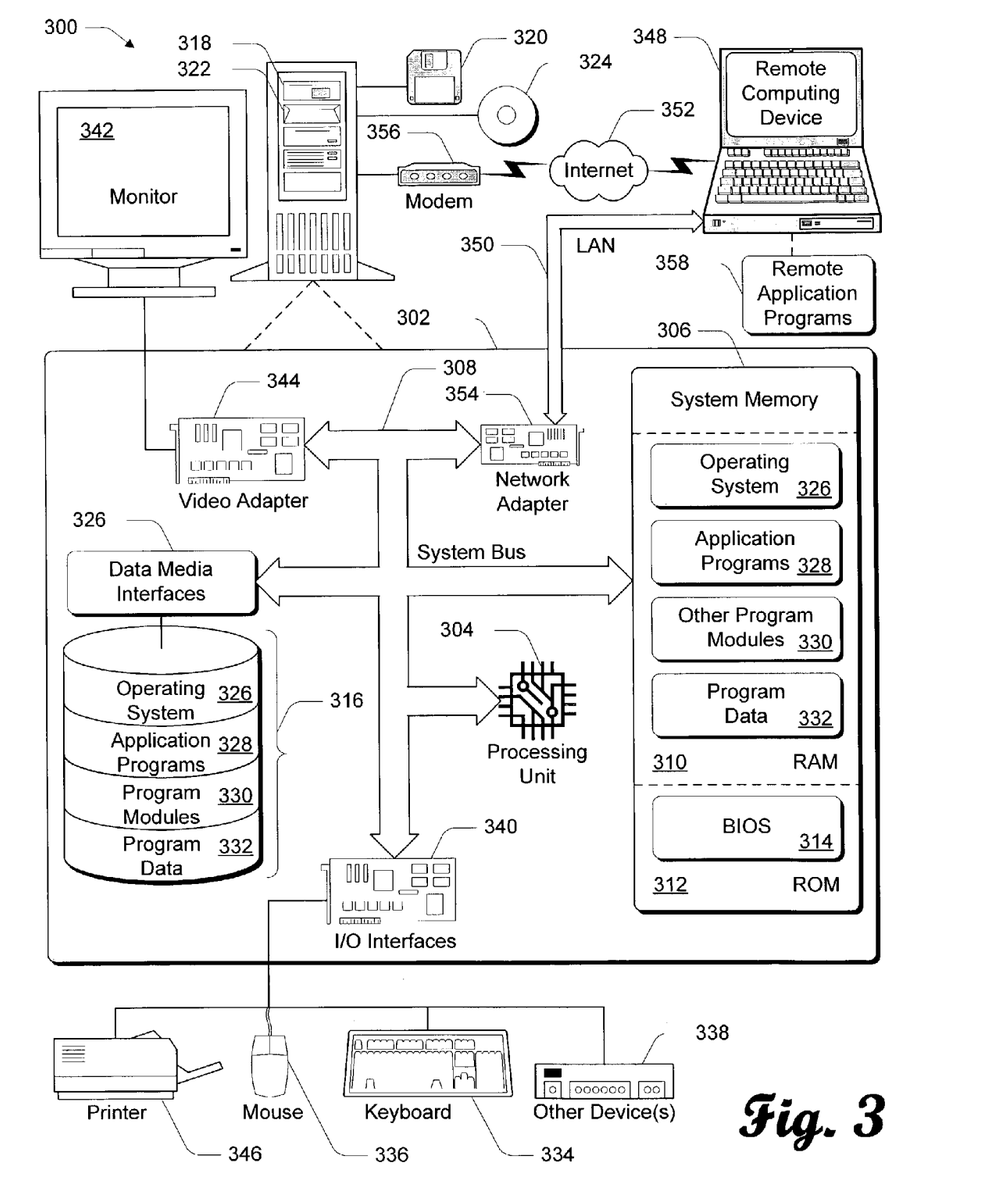
FIG. 3 is an example of a computing operating environment capable of (wholly or partially) implementing at least one embodiment described herein.

The one or more exemplary implementations, described herein, of the present claimed invention may be implemented (in whole or in part) by an install-config program module 140 and/or by a computing environment like that shown in FIG. 3.

Within the context of a deployment, simply installing a set of software products on a single target machine and making them work together in a well-controlled, secure, and live production environment is tedious and risky. Furthermore, the probability of human error is high.

The exemplary install-config manager provides for the installation, configuration, and/or uninstallation of software components on one or more target computing systems. On purpose for doing so is to integrate multiple otherwise independent software products into a system for the system to perform a dedicated role. Examples of these software components include applications, files, directories, registry keys, middleware applications, and other such items. Examples of a dedicate role for the system includes web server, database server, and credit card processor. Of course, these are only a few examples and are not an exhaustive list of such examples.

The exemplary install-config manager includes a runtime interpreting installation and configuration ("install-config") program module and one or more data-based, runtime interpreted, install-config feature descriptions. Herein, the term "install-config" refers to installation and/or configuration. It also may include un-installation as well.

The exemplary install-config manager utilizes defined data-driven specifications by abstracting the data in a plain-text format (e.g., XML), predicts and handle errors, and provides logging and reporting without any human intervention being necessary. Therefore, the exemplary install-config manager reduces the time and labor needed to build hundreds or thousands of similarly or identically configured computing systems.

Exemplary Install-Config Feature Descriptions

Unlike the conventional installation programs, the specific install-config actions performed by the exemplary install-config manager are not part of a compiled (and, thus, unmodifiable) program module. Rather, the specific install-config actions are directed by one or more data-based, runtime interpreted, human-readable, install-config feature descriptions. These descriptions may also be called feature specifications.

An embodiment of the exemplary install-config manager (wholly or partially) is a runtime interpretative install-config program module 140 ("installer") and it acts upon the well-formed data of the feature descriptions.

Examples of feature descriptions include:
Product Requirements;
OS Interface;
Build Specification;
Runtime Specification; and
Runtime Actions.

The "Product Requirements" feature descriptions are those needed to make the installed software product(s) fully functional and operational. They may also make the install-config easier to use in an operational environment.

The "OS Interface" feature descriptions describe mechanism(s) used to make changes to the computing system during installation and configuration.

The "Build Specification" feature descriptions describe an original specification of installation data, which may appear in different forms. Before generation of a specific installation package ("the build") for the installation of a defined set of components, the specification is designed for humans to interpret. After the build, the specification is designed for machines to interpret.

The "Runtime Specification" feature descriptions describe the human-readable element of specification that is available after the build and directly affects the installation execution.

The following is an example of a runtime-specifications feature description. In it, feature1 is enabled on machines with hostname (in the format: "hostname=format-*") and feature2 is disabled:

```
<Condition hostname="hostname-format-*">
   <Property Name=" feature1" Value="1"/>
   <Property Name=" feature2" Value="2"/>
</Condition>
<Condition feature1="1">
   <MSI UserIdentity="feature1SvcUser"
File="[SOURCEDIR]\setup.msi
ADDLOCAL="feature1"
   installdir="[INSTALLDIR]\bin"/>
</Condition>
```

The "Runtime Actions" feature descriptions describe the link between the runtime specification and the OS interface. Once running the install-config program module 140 performs actions sequentially. Failure of sub-processes does not cause the manager to fail. In general, the install-config program module 140 should not fail, crash, raise exceptions, or prompt for user action. Of course, if so desired, the user may manually terminate the install-config prematurely.

The following is an example of a runtime-actions feature description:

<Condition Config="config-type">
    <Execute File="% SystemRoot %\System32\cacls.exe Parameters="'[INSTALLDIR]"/T /E /G Users:F"'/>
</Condition>

Both the runtime-actions and runtime-specification feature descriptions are in a human-readable format that is easily modifiable and runtime interpreted. Herein, the term "clear-text" is used to describe a digital data format that is both human-readable and easily modifiable. Herein, the "plain-text" and "clear-text" are interchangeable. An example of a suitable format is the eXtensible Mark-up Language (XML).

Since these feature descriptions are in "clear-text," they may be easily modified at any point and not just during the development process by the developers. There is no need for the installation software developers to generate a new executable installation program in order for it to perform a customize install-config. At runtime, the install-config program module 140 interprets one or more clear-text files and performs operations based upon that.

With such a clear-text file, a person may easily determine exactly how the installation will proceed. In at least one sense, the content of the one or more clear-text files may be thought of as an interpreted language with its own syntax. Part of that syntax is the use of "verbs." When interpreted at runtime by the install-config program module 140, these verbs direct it to perform specific functions or tasks related to the install-config.

Exemplary Install-Config Manager

Figure 1:
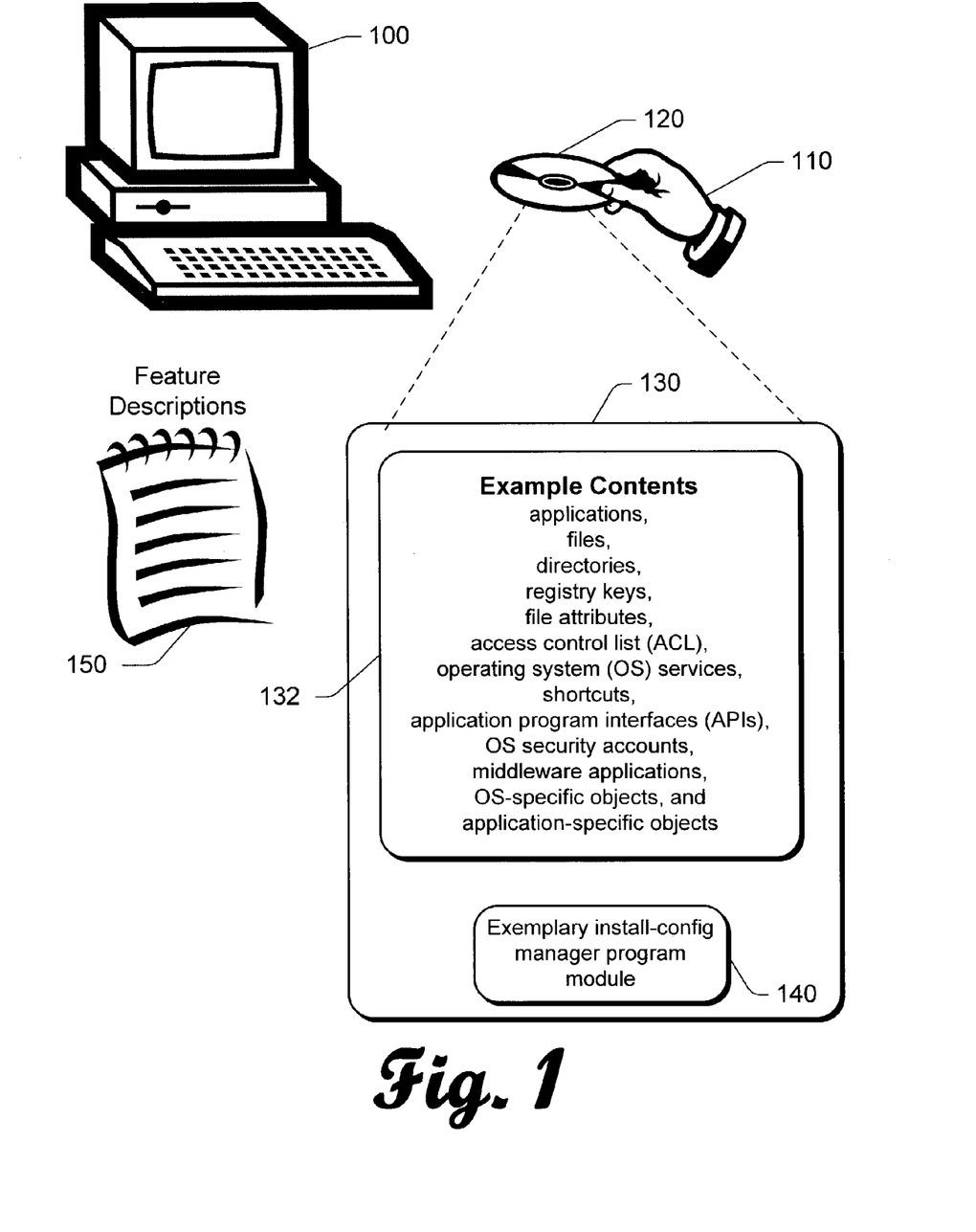
FIG. 1 is illustration of a typical use in accordance with an implementation described herein.

FIG. 1 illustrates an example of typical scenario for the use of the exemplary install-config manager. The computing system 100 represents a typical target system for the install-config process. The system admin 110 inserts a removable-storage medium 120 (e.g., a CD-ROM) for install-config of that system. The contents 130 of that medium 120 include both software components 132 for install-config and the install-config program module 140.

Examples of these software components 132 include (by way of example and not limitation) one or more of the following: applications, files, directories, registry keys, file attributes, access control list (ACL), operating system (OS) services, shortcuts, application program interfaces (APIs), OS security accounts, middleware applications, and OS-specific objects and application-specific objects. Except for their collection and use here, each of these software components may have been otherwise independent of the other components-even the others that are alike in type.

The admin also provides one or more feature description files 150. These may be found on the same medium as the install-config contents 130, on a separate removable-storage medium (e.g., floppy disk, Flash memory, etc.), or other source.

Alternatively, the system 100 may gain access to the contents 130 and the feature descriptions 150 via other mediums, such as a communications network and a non-removable storage medium.

With the install-config program module 140, the complete installation and configuration of a computing system may be highly automated. This is especially true if the system is deployed for a dedicated or specific task (such as credit card processing). A software developer, system admin, or other persons (e.g., person 110) may create or modify one or more feature-description data files. These data files are described in more detail above.

In short, these data files 150 direct the install-config of software components 132 to produce a specifically configured computing system, and especially one designed to perform a specific role or task. These data files 150 may also direct the install-config program module 140 to perform other automated tasks required to produce a fully operative system, especially one with a specific role.

Examples of such specific roles include credit card processor, file repository server, electronic mail server, discovery server, and ad server. Of course, these are just examples. Many other specific roles exist and will exist.

Operation

Figure 2:
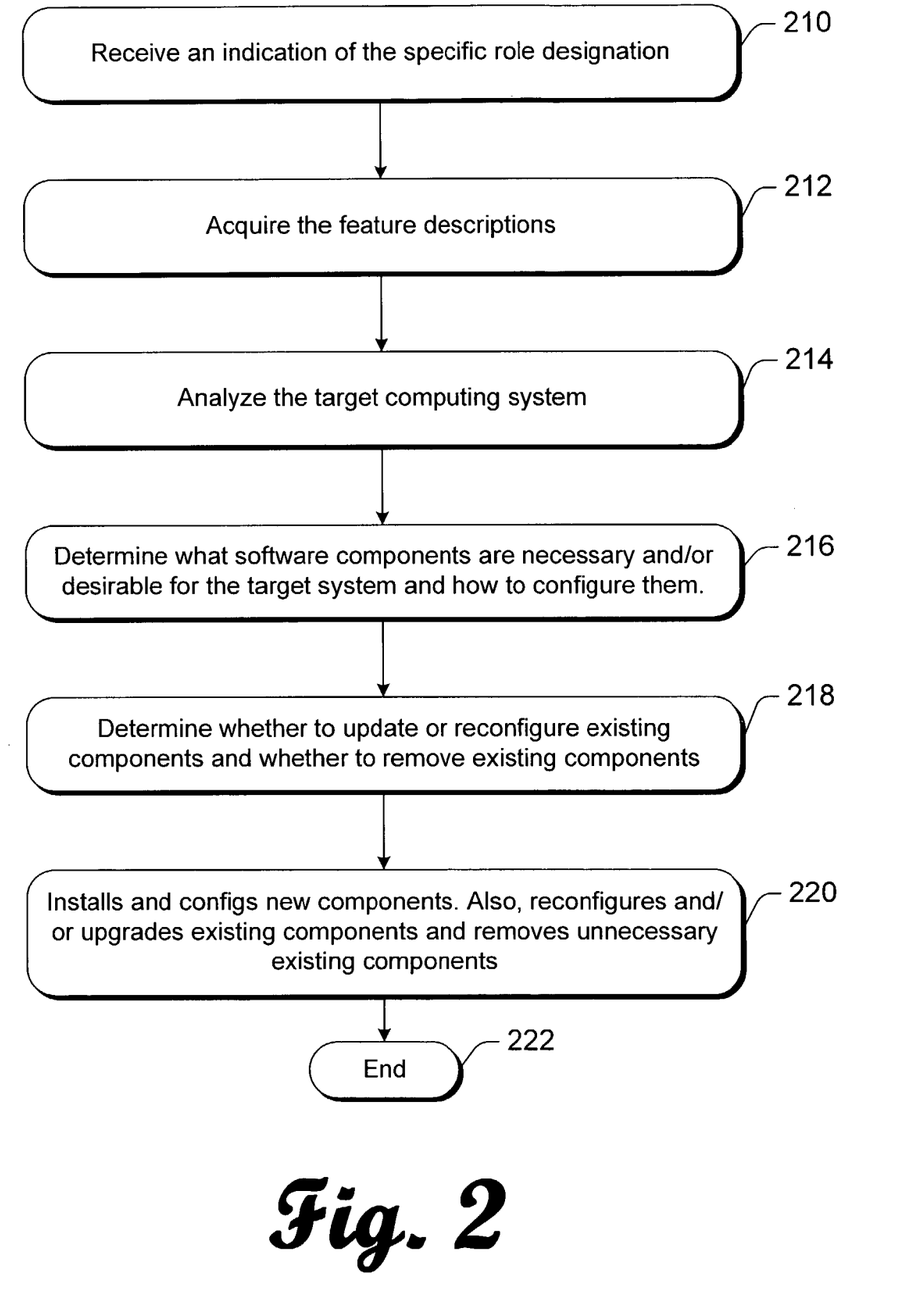
FIG. 2 is a flow diagram showing a methodological implementation described herein.

FIG. 2 shows methodological implementation of the exemplary install-config manager performed by the install-config program module 140 (or some portion thereof). This methodological implementation may be performed in software, hardware, or a combination thereof.

As opposed to the conventional approaches, all of the install-config decisions are automatically made by a program module (e.g., the install-config program module 140) rather than manually—by a person, such as the system admin.

Typically, a system administrator ("system admin") specifies a specific overall task or role (as opposed to specifying a particular software application) for the target computing system. The install-config program module 140 determines what software components are necessary and/or desirable to perform that assigned task and to configure them.

The install-config program module 140 manages the runtime install-config process. It may be, for example, a single executable image. It is a utility that is independent of the product(s) it is installing.

At 210 of FIG. 2, the install-config program module 140 receives an indication of the specific role designation (or definition).

At 212, it acquires the feature descriptions (such as files 150). The role designation may be part of the feature descriptions. The install-config program module 140 reads and parses the data of the feature descriptions. Some of feature descriptions (e.g., runtime-specification and runtime-actions) direct the install-config program module 140 during this automated process.

At 214, the install-config program module 140 analyzes the target computing system. It determines the software and hardware specifications of the target system.

At 216, based upon this analysis and the specific role designation, the install-config program module 140 determines what software components are necessary and/or desirable for the target system and how to configure such components.

At 218, based upon this analysis and the specific role designation, it determines if it is desirable to update existing software components for its assigned task. Furthermore, it determines how to reconfigure and whether to remove existing software components.

These determinations utilize information, data, and directions of the feature description files.

At 220, as deemed necessary or desirable by these determinations, the install-config program module 140 installs new components. As deemed necessary or desirable, it also reconfigures and/or upgrades existing components and removes unnecessary existing components.

Alternatively, the install-config program module 140 may recommend hardware changes to accommodate or enhance the specified role.

At 222, the process ends.

As part of the process described above, the install-config program module 140 may perform some or all of the following functions:

- Checks that the current user is authorized for installation and configuration.
- Outputs install status information and errors to logs and/or to standard output devices (e.g., a monitor).
- Maintains internal properties table. Such a table may include key-value string pairs. Tokenizing may replace a property name in brackets with the property value.
- Parses one or more feature description documents (e.g., "Setup.xml") and performs actions based directly on the elements and attributes specified therein. Attribute value text and body text is tokenized before it is parsed so that bracketed property keys can be replaced with their value.
- Reads the registry—when a registry path is specified to be read all of the values of that key are set in the properties table.
- Restricts command line parameters by having a node, which specifies the required and optional command line parameters. This prevents typos in the command line from resulting in undesirable actions.
- Evaluates conditional data so that if conditions are met then specific actions can be performed.
- Enables secure handling of user names and passwords. See the "Security Feature for the Exemplary Install-Config Manager" section below.
- Creates processes and redirects standard input, output, and error pipes. It may create a process to run as a different user to perform a specific install-related action.

Security Feature for the Exemplary Install-Config Manager

When installing and configuring software components, installation programs frequently require security access. Typically, it needs a username and password. Without more, the usernames and passwords used by the exemplary install-config manager would be "in the clear." Since the feature descriptions are in a plain or clear-text format, anyone with access to the feature description files would have access to usernames and passwords authorized to modify the computing system.

Furthermore, occasionally the person deciding what should be installed and how things are configured may not have the passwords necessary to perform such actions. For example, a consultant may be tasked to configure a massive live operational site (e.g., live multimedia broadcast services). However, the consultant typically does not have the permission to make the necessary installation and configuration changes directly.

To address this situation, the exemplary install-config manager employs an "identity" to effectively hide the sensitive username and password information. This identity indicates to the exemplary install-config manager that it should look for username and password in a specific file stored in a secured location.

For this, the "identity" file is located in a location with proper security properties. The location of this identity file may be determined by the operator who is directly responsible for the installation itself. The exact mechanism for this security may vary by implementation. For example, the exemplary install-config manager (and its install application) may run with the credentials of the currently logged in user, unless an "identity" file is specified.

Alternatively, it may simply ask the user for a password.

Exemplary Computing System and Environment

FIG. 3 illustrates an example of a suitable computing environment 300 within which an exemplary install-config manager, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary install-config manager may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary install-config manager may be described in the general context of computer-executable instructions, such as program modules, being executed by a computer. Generally, program modules include routines, programs, objects, components, data structures, etc. that perform particular tasks or implement particular abstract data types. The exemplary install-config manager may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 302 may include, by are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media may be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 may be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 316, magnetic disk 320, optical disk 324, ROM 312, and/or RAM 310, including by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components such as speakers (not shown) and a printer 346 which may be connected to computer 302 via the input/output interfaces 340.

Computer 302 may operate in a networked environment using logical connections to one or more remote computers, such as a remote computing device 348. By way of example, the remote computing device 348 may be a personal computer, portable computer, a server, a router, a network computer, a peer device or other common network node, and the like. The remote computing device 348 is illustrated as a portable computer that may include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Computer-Executable Instructions

An implementation of an exemplary install-config manager may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary install-config manager may be implemented. Specifically, the exemplary install-config manager(s) described herein may be implemented (wholly or in part) by any program modules 328–330 and/or operating system 326 in FIG. 3 or a portion thereof.

The operating environment is only an example of a suitable operating environment and is not intended to suggest any limitation as to the scope or use of functionality of the exemplary install-config manager(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary install-config manager may be stored on or transmitted across some form of computer readable media. Computer readable media may be any available media that may be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium having computer-executable instructions that, when executed by a computer, performs a method comprising:
   receiving an indication of a specific role designation for a target computing system;
   acquiring and interpreting feature descriptions associated with the indicated specific role designation for the target computing system, wherein the interpreted feature descriptions include directions formatted in "plain-text" runtime interpretable data and include an "identity" indicator;
   based upon the "identity" indicator, obtaining authorization to perform installation or configuration of new software components and updating, reconfiguration, or removal of existing software components;
   analyzing the target computing system;
   based upon the indicated specific role designation and interpretation of the feature descriptions, determining all of the following:
      whether to install and configure any new software components and if so, selecting which ones;
      whether to update any existing software components and if so, selecting which ones;
      whether to reconfigure any existing software components and if so, selecting which ones;
      whether to remove any existing components and if so, selecting which ones;
   responsive to the determining and selecting:
      installing and configuring new software components selected for such;
      updating existing software components selected for such;
      reconfiguring existing software components selected for such;
      removing existing software components selected for such.

2. A medium as recited in claim 1, wherein the feature descriptions are embodied on a computer-readable medium in a "plain-text" digital format.

3. A medium as recited in claim 1, wherein the feature descriptions are embodied on a computer-readable medium in an XML digital format.

4. A medium as recited in claim 1, wherein the feature descriptions include an "identity" indicator and when an identity is interpreted, acquiring authorization data from a secure location.

5. A medium as recited in claim 1, wherein the software components are selected from a group consisting of applications, files, directories, registry keys, file attributes, access control list (ACL), operating system (OS) services, shortcuts, application program interfaces (APIs), OS security accounts, middleware applications, and OS-specific objects and application-specific objects.

6. A computing device comprising:
   an audio/visual output;
   a medium as recited in claim 1.

7. A computer-readable medium having computer-executable instructions that, when executed by a computer, performs a method comprising:
   analyzing a target computing system;
   acquiring feature descriptions containing "plain-text" runtime interpretable data, wherein the feature descriptions include an "identity" indicator;
   runtime interpreting the data of the feature descriptions;
   based upon the "identity" indicator, obtaining authorization to perform installation or configuration of new software components and updating, reconfiguration, or removal of existing software components;
   based upon the runtime interpretation of feature descriptions and analysis of the target computing system, determining whether to install and configure any new software components and if so, selecting which ones;
   based upon the determining and selecting, installing and configuring new software components selected for such.

8. A medium as recited in claim 7 further comprising:
   based upon the runtime interpretation of feature descriptions, determining whether to update any existing software components and if so, selecting which ones;
   based upon the determining and selecting, updating existing software components selected for such.

9. A medium as recited in claim 7 further comprising:
   based upon the runtime interpretation of feature descriptions, determining whether to reconfigure any existing software components and if so, selecting which ones;

based upon the determining whether to reconfigure and selecting, reconfiguring existing software components selected for such.

10. A medium as recited in claim 7 further comprising:
based upon the runtime interpretation of feature descriptions, determining whether to remove any existing components and if so, selecting which ones;
based upon the determining whether to remove and selecting, removing existing software components selected for such.

11. A medium as recited in claim 7, wherein the feature descriptions are embodied on a computer-readable medium in a "plain-text" digital format.

12. A medium as recited in claim 7, wherein the feature descriptions are embodied on a computer-readable medium in an XML digital format.

13. A medium as recited in claim 7, wherein the authorization is represented by authorization data which comprises a username and password pair.

14. A medium as recited in claim 7, wherein the software components are selected from a group consisting of applications, files, directories, registry keys, file attributes, access control list (ACL), operating system (OS) services, shortcuts, application program interfaces (APIs), OS security accounts, middleware applications, and OS-specific objects and application-specific objects.

15. A computing device comprising:
an audio/visual output;
a medium as recited in claim 7.

16. A computer-readable medium having computer-executable instructions that, when executed by a computer, performs a method comprising:
acquiring feature descriptions containing "plain-text" runtime interpretable data;
runtime interpreting the data of the feature descriptions, wherein the interpreted feature descriptions include directions formatted in "plain-text" runtime interpretable data and include an "identity" indicator;
based upon the "identity" indicator, obtaining authorization to perform installation or configuration of new software components and updating, reconfiguration, or removal of existing software components;
following the directions of the runtime interpretation of feature descriptions, wherein the following comprises:
determining whether to install and configure any new software components and if so, selecting which ones;
based upon the determining and selecting, installing and configuring new software components selected for such.

17. A medium as recited in claim 16 further comprising analyzing a target computing system.

18. A medium as recited in claim 16 further comprising:
based upon the runtime interpretation of feature descriptions, determining whether to update any existing software components and if so, selecting which ones;
based upon the determining and selecting, updating existing software components selected for such.

19. A medium as recited in claim 16 further comprising:
based upon the runtime interpretation of feature descriptions, determining whether to reconfigure any existing software components and if so, selecting which ones;
based upon the determining whether to reconfigure and selecting, reconfiguring existing software components selected for such.

20. A medium as recited in claim 16 further comprising:
based upon the runtime interpretation of feature descriptions, determining whether to remove any existing components and if so, selecting which ones;
based upon the determining whether to remove and selecting, removing existing software components selected for such.

21. A medium as recited in claim 16, wherein the feature descriptions are embodied on a computer-readable medium in a "plain-text" digital format.

22. A medium as recited in claim 16, wherein the feature descriptions are embodied on a computer-readable medium in an XML digital format.

23. A medium as recited in claim 16, wherein the obtaining comprising accessing authorization data from a secure location.

24. A medium as recited in claim 16, wherein the obtaining comprising accessing a username and password pair is automatically acquired from a secure location.

25. A medium as recited in claim 16, wherein the software components are selected from a group consisting of applications, files, directories, registry keys, file attributes, access control list (ACL), operating system (OS) services, shortcuts, application program interfaces (APIs), OS security accounts, middleware applications, and OS-specific objects and application-specific objects.

26. A computing device comprising:
an audio/visual output;
a medium as recited in claim 16.

* * * * *